United States Patent [19]
Teixeira et al.

[11] Patent Number: 5,947,642
[45] Date of Patent: Sep. 7, 1999

[54] METHOD AND APPARATUS FOR CONNECTING AN UNDERWATER FLEXIBLE RISER TO A STRUCTURE ON THE SURFACE

[75] Inventors: Marcelo Jose Barbosa Teixeira; Kazuhiko Kochi, both of Rio de Janeiro, Brazil

[73] Assignee: Petroleo Brasileiro S.A. - Petrobras, Brazil

[21] Appl. No.: 08/975,255

[22] Filed: Nov. 21, 1997

[30] Foreign Application Priority Data

Nov. 22, 1996 [BR] Brazil .................................. 9605669
Sep. 8, 1997 [BR] Brazil .................................. 9605669

[51] Int. Cl.$^6$ ............................................ F16L 1/04
[52] U.S. Cl. .................. 405/195.1; 166/340; 166/367; 405/224; 405/170
[58] Field of Search ................ 405/195.1, 169, 405/170, 171, 224, 224.1–224.4, 223.1; 166/350, 359, 367, 338–343, 345, 349; 403/322.3, 326, 317

[56] References Cited

U.S. PATENT DOCUMENTS

| | | | |
|---|---|---|---|
| 3,096,999 | 7/1963 | Ahlstone et al. | 166/340 |
| 3,163,228 | 12/1964 | Hayes | 166/340 X |
| 3,195,639 | 7/1965 | Pollard et al. | 166/340 |
| 3,325,190 | 6/1967 | Eckert et al. | 166/344 |
| 3,492,027 | 1/1970 | Herring | 166/340 X |
| 3,841,665 | 10/1974 | Capot | 166/340 X |
| 4,059,148 | 11/1977 | Blomsma | 166/359 |
| 4,403,658 | 9/1983 | Watkins | 166/367 X |
| 4,585,269 | 4/1986 | Manesse et al. | 405/224 X |
| 4,808,034 | 2/1989 | Birch . | |
| 5,437,518 | 8/1995 | Maloberti et al. . | |

FOREIGN PATENT DOCUMENTS 2 203 508  10/1988  United Kingdom .
WO 98 23845  6/1998  WIPO .

Primary Examiner—Dennis L. Taylor
Attorney, Agent, or Firm—Nixon & Vanderhye P.C.

[57] ABSTRACT

The present invention relates to an apparatus and to a method for facilitating the connection of underwater flexible risers coming from the sea bed at any point located above the sea surface on a surface structure. Two principal components are used, namely a guide device (1,51), and a connection device (8), which is connected to an underwater flexible riser (14) which it is desired to connect to the structure.

17 Claims, 16 Drawing Sheets

METHOD AND APPARATUS FOR CONNECTING AN UNDERWATER FLEXIBLE RISER TO A STRUCTURE ON THE SURFACE

FIELD OF THE INVENTION

The present invention relates to a method and to an apparatus for facilitating the connection of flexible pipes coming from the sea bed to a structure on the surface.

BACKGROUND OF THE INVENTION

The object of the present invention is to provide an apparatus and a method for using the apparatus, which enable flexible lines coming from the sea bed to have their ends connected directly to the receiving structure at any location above the sea surface.

PRIOR ART

With the discovery of hydrocarbon-producing fields in ever greater depths of water, the use of rigid structures fixed to the sea bed and intended for the installation of production facilities has been becoming increasingly expensive. In some cases, owing to conditions peculiar to the region where the hydrocarbon-producing field is located, the use of such structures is unviable.

More recently, floating structures have become an increasingly used alternative for the installation of production facilities because they are usually an option which is less expensive than fixed structures.

Another advantage to be taken into account is the possibility of using an existing floating structure which can in a relatively short period be adapted to receive production facilities, thereby starting production in a hydrocarbon-producing field in a relatively short period and at a relatively low cost.

This is one of the major advantages of using floating structures, since there is always the possibility of using a semi-submersible platform, or a ship or any other type of floating structure which can be adapted to receive production facilities, thereby significantly reducing the initial investment required for the field to go into production, the costs of adaptation being significantly lower than the costs of manufacturing a rigid structure.

However, the use of floating structures for installing production facilities does present a number of problems. The first of these relates to positioning at the site where it will be stationed. The system used must guarantee that the floating structure will remain in its ideal position, although allowing for slight variations resulting from sea and atmospheric conditions.

Having solved this problem, the next hurdle relates to the system for connecting, to the floating structure, the flexible lines coming from the sea bed. These lines, known by specialists as "risers", may, for example, be lines conveying hydrocarbons, or hydraulic lines, or electrical cables, or a combination of these.

Various technologies have been developed to facilitate the connection of risers to the floating structure. In simplified terms, these technologies can be divided into two basic categories:

the first category might include those technologies which facilitate the connection of risers to some point on the floating structure, below the sea surface;

the second category might include those technologies which facilitate the connection of risers to some point above the sea surface.

The major problem which arises with the first group of technologies mentioned above relates specifically to the need to use divers or, alternatively, remotely operated equipment, for carrying out the connection operations. This is a delicate and extremely important operation, since any failure may give rise to situations of high risk for the equipment as a whole and for the crew on board the floating structure.

In the second group of technologies this problem is eliminated since the riser is conveyed to a certain point on the floating structure above the sea surface, where the connection operation can be carried out in greater safety and by specialized personnel. However, there are a number of problems which have to be overcome.

The fact that the riser is to be connected to the floating structure at a location above the sea surface brings with it a serious problem. The normal sea swell causes the risers to move by fairly substantial amounts owing to their characteristic flexibility. There is then a tendency for the risers frequently to touch some part of the floating structure, which can seriously damage their outer sheathing. To avoid this situation occurring, attempts are usually made to install the risers at a relatively great distance from the floating structure.

However, such a solution is a serious limitation on the use of these technologies since, depending on the space available on the floating structure for the installation of connection points, it is possible to arrive at an extreme situation in which there is insufficient space for connection of the desired number of risers.

A number of solutions to this problem have been proposed: U.S. Pat. No. 4,808,034 suggests the use of a guide ring with two guide posts, to which two cables are fastened. Inside the guide ring there is a cut-away zone into which is fitted the connector of the riser. A bending stiffener is installed immediately below the guide ring.

When the operation of raising the cables fastened to the guide posts of the guide ring is carried out on the floating structure, the riser connector accompanies the cables. Consequently, the riser is raised up to the floating structure. At some point below the sea surface the guide ring butts against a receiving flange which has two guide tubes enclosing the cables fastened to the guide posts of the guide ring. These guide tubes are also intended to serve as receptacles for the guide posts of the guide ring.

The receiving flange is connected to a guide tube which is securely fastened to the floating structure. When the guide posts of the guide ring are fitted into the guide tubes of the receiving flange, the riser connector begins to be raised up to the connection point which is located on some part of the floating structure above the sea surface. For carrying out this operation, a cable will have previously been fastened to the riser connector, which enables the entire assembly to be pushed inside the guide tube as far as the connection point. This tube prevents the natural movement of the sea from being transmitted to the riser.

This solution represented a major advance in terms of systems for connecting underwater risers. However, the use of different guide cables for raising the guide ring and the riser connector may constitute a problem, given that it is necessary to achieve perfect synchronization of the movement of taking up the guide cables, since, if this is not achieved, there is always the possibility that one guide cable will at any moment move faster than the other, which might lead to the riser becoming withdrawn from its original position inside the guide ring, with serious consequences for the connection operation.

The present invention aims to eliminate this problem by arranging for the pipe to be raised by a single cable, thereby making the operation safer. In addition, the ease of operation thereby provided makes it possible substantially to reduce the amount of time spent on the tasks of raising and coupling flexible pipes.

SUMMARY OF THE INVENTION

The present invention relates to a method and to an apparatus for facilitating the connection of a flexible pipe coming from the sea bed to some point above the sea surface located on a surface structure.

The apparatus of the present invention basically comprises two principal components: a guide device secured to a structure on the surface of the sea, which has guiding means and locking means for locking the second basic component, a coupling device, which is fastened to the end of an underwater flexible riser.

The coupling device is raised from the sea bed by at least one cable so that, when the coupling device is locked on the guide device, the connection end of the underwater flexible riser can continue to be raised by the cable up to any point on the structure, which is located on the surface, where connection of the underwater flexible riser will take place.

A second aspect of the present invention is a method for the use of the above apparatus for connecting an underwater flexible riser to a structure on the surface. The method describes the steps for raising, locking and, if needed, unlocking the underwater flexible riser to the structure.

BRIEF DESCRIPTION OF THE DRAWINGS

The invention will now be presented in greater detail, in conjunction with the drawings mentioned below which, purely by way of example, accompany the present specification and form an integral part of it. In the Figures.

DESCRIPTION OF THE PREFERRED EMBODIMENTS

Figure 1:
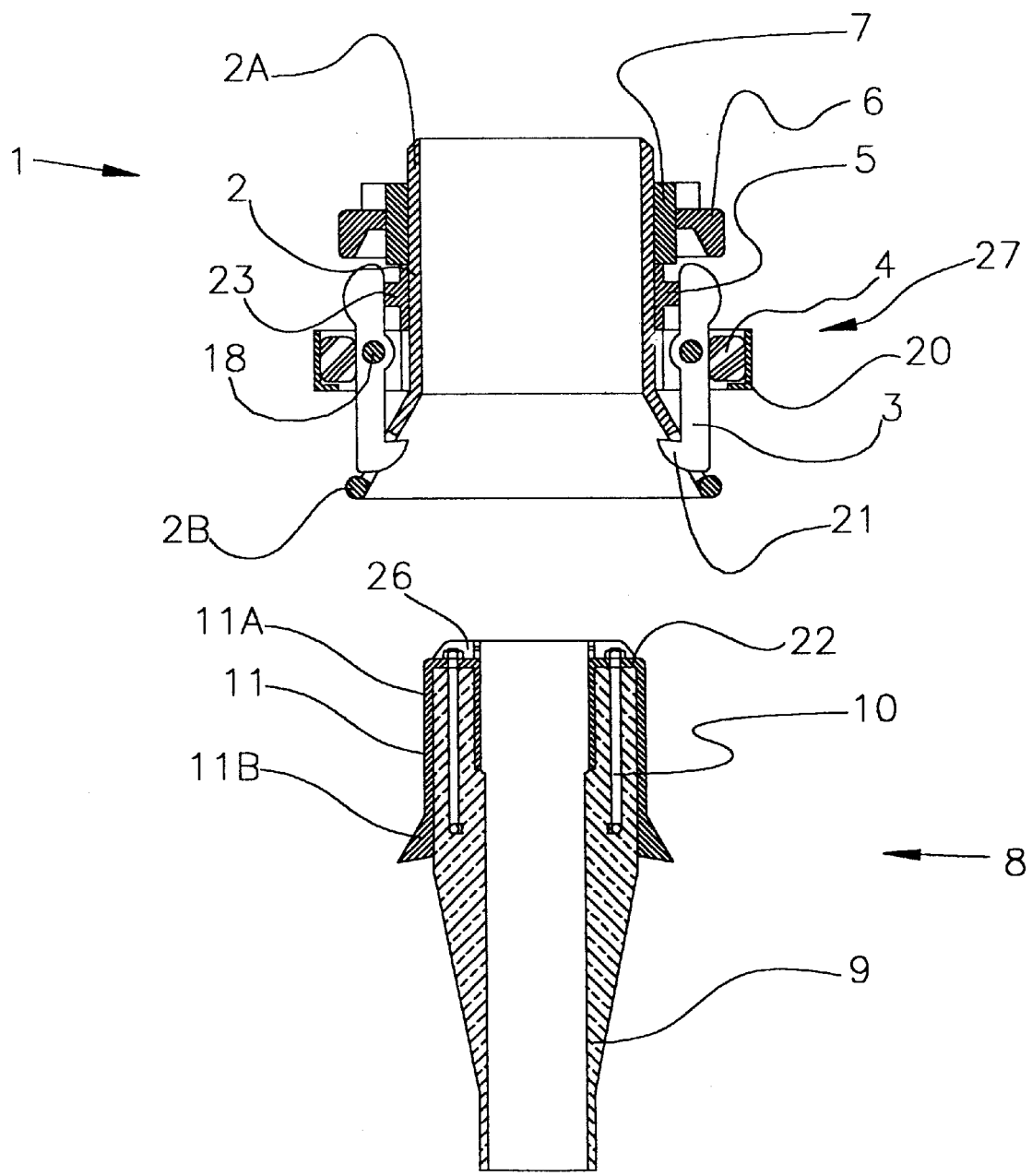
FIG. 1 shows the components of a first embodiment of the apparatus of the present invention, for connecting a flexible pipe.

FIG. 1 shows a first embodiment of the apparatus, for connecting a underwater flexible riser to a structure on the surface, which basically comprises two parts: a guide device 1 and a coupling device 8. The guide device 1 basically comprises a body 2 whose upper part 2A has the shape of a cylinder and whose lower part 2B has the shape of a frustum of a cone. The components of a locking mechanism 27 are fastened to the body 2, these being a locking ring 5, an unlocking collar 6, a guide element 7, supports 20, locking means (in this case pawls) 3 and elastic elements 4.

The guide element 7 and the supports 20 are fastened securely to the body 2. The locking pawls 3 are pivotally connected to the supports 20 by means of spindles 18 which are securely fastened to the supports 20. The lower part of each locking pawl 3, which has the shape of a claw 21, can pass inside slots in the lower part 2B of the body. As may be seen below, the rotational movement of the locking pawls 3 is limited and is sufficient only to fulfil the function for which they are intended.

Inside the supports 20 are elastic elements 4 whose function is to hold the respective locking pawl 3 in the locking position, as shown in FIG. 1 and as will be better understood on the basis of the description of the method which will be given below.

Figure 7:
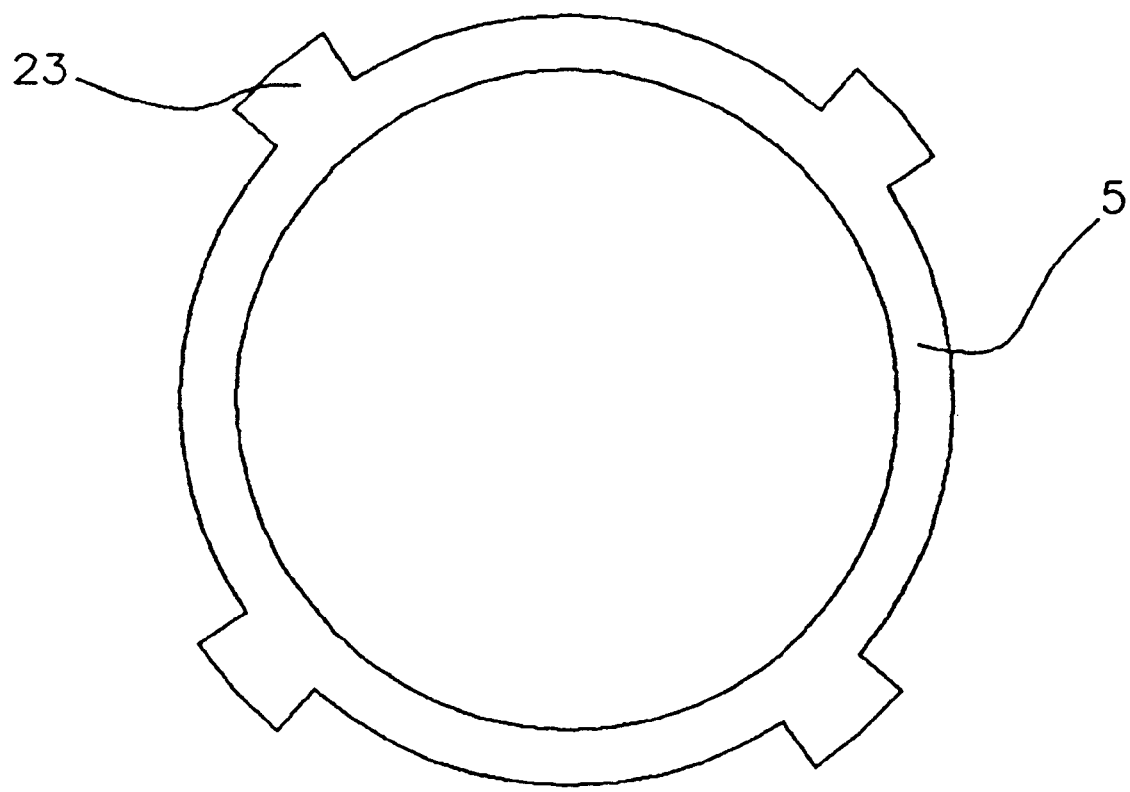
FIG. 7 shows a locking ring which is used in the first embodiment of the apparatus of the present invention.

The function of the locking ring 5 is to hold the locking pawls 3 in the locked position, after the coupling device 8 has been coupled to the guide device 1, with the aim of preventing, after completion of the coupling operation, any vibrations or movements being able to give rise to unlocking of the coupling device 8. FIG. 7 shows the locking ring in greater detail. As will be ascertained from the description of the method for use of the apparatus of the present embodiment of the invention, the locking ring 5 may, if necessary, be turned about its axis, and such turning determines the positioning of the projections 23, which are designed to lock the respective locking pawls 3 as stated above.

FIG. 1 also shows the coupling device 8 as comprising a guide 11 and fastening elements 10 which, in the present embodiment, are connected to a bending stiffener 9, which is a component usually used on risers and is located at the end which will be connected to the structure. Its function is to give greater rigidity to the end of the riser and to prevent any creases forming which might cause it to rupture. However, this component does not form part of the invention and is mentioned here as it is an important interface between underwater flexible risers and the apparatus of the invention, as will be seen below.

The lower part 11B of the guide has the shape of a frustum of a cone. The upper part 11A of the guide has the shape of a cylinder and totally encloses the upper part of the bending stiffener 9. This upper part 11A of the guide has a hollowed cover 22 placed over the end of the bending stiffener 9. A collar 26 is fastened to the hollowed cover 22. The fastening elements 10 are responsible for fastening the bending stiffener 9 to the cover 22 of the guide 11.

Figure 2:
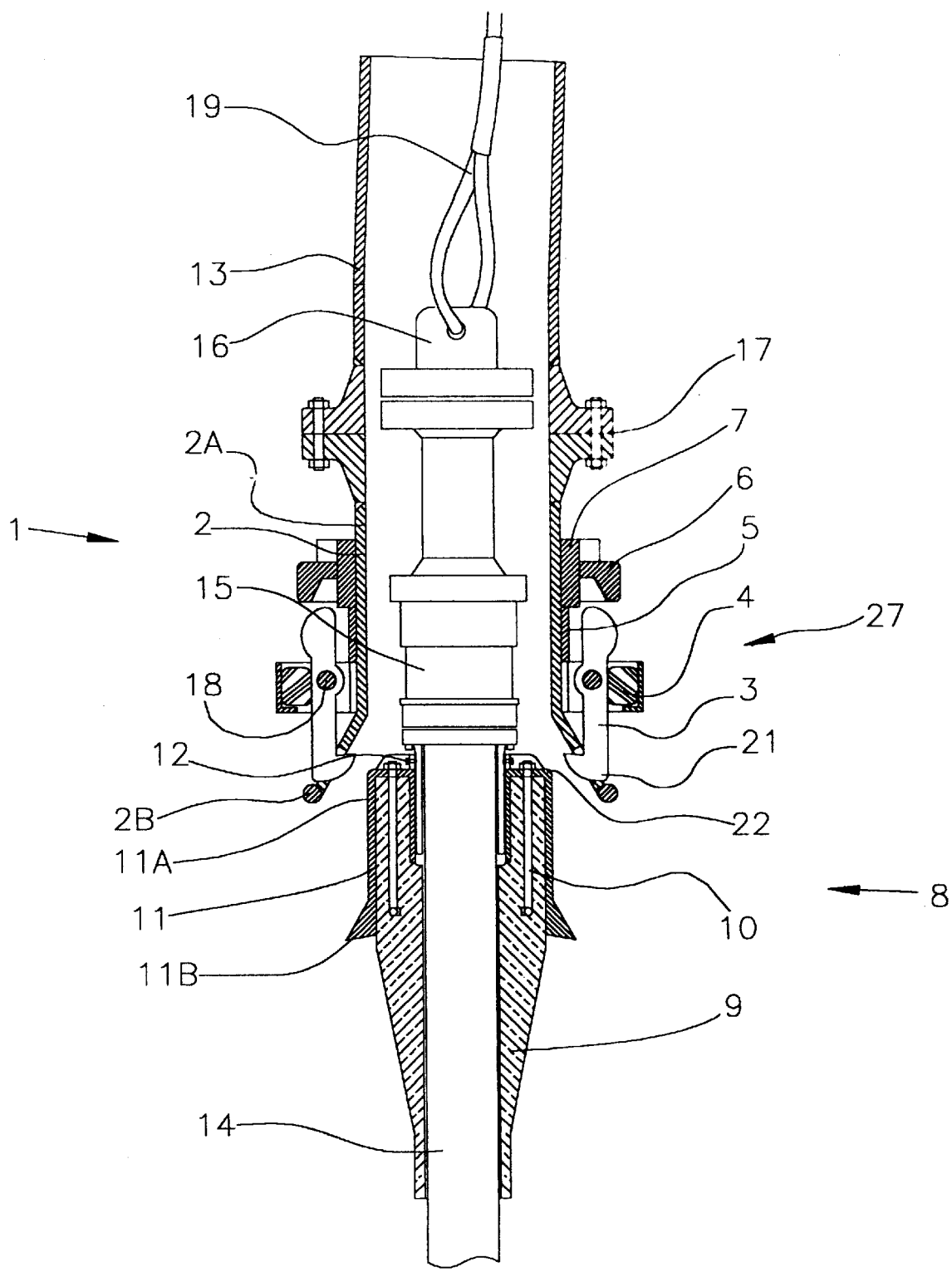
FIG. 2 shows a flexible pipe connected to the first embodiment of the apparatus, in a position close to the start of the operation of engaging its principal components.

FIG. 2 shows the body 2 of the guide device 1 securely connected in its upper part to a connection device 17 which, in turn, is connected to the lower part of a sleeve tube 13 which extends as far as any point on a surface structure, not shown in the Figure, which is located above the sea surface. It should be pointed out that the connection device 17 and the sleeve tube 13 do not form an integral part of the present invention and are shown only in order to make it easier to understand the invention.

FIG. 2 also shows a underwater flexible riser 14 installed inside the coupling device 8. This flexible riser is what has to be raised as far as the respective point of connection on the structure, above the sea surface. The end of the underwater flexible riser 14 is connected to a terminal connection 15 which, in turn, is connected to a traction head 16. Again, these two components do not form an integral part of the invention and are mentioned here because they are fundamental to understanding the invention.

Figure 8:
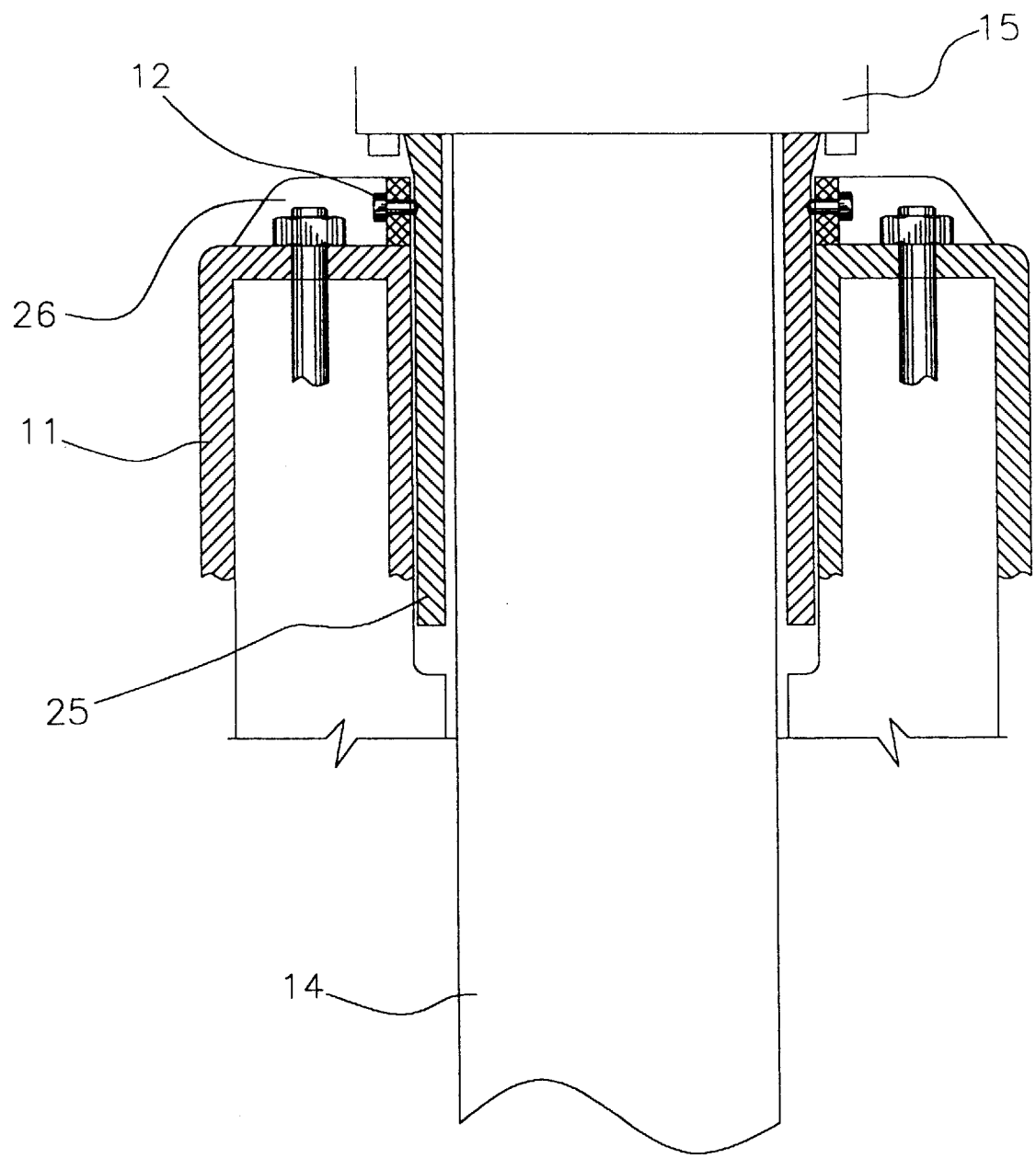
FIG. 8 is a detail of the fastening of a pipe to the coupling device, which is one of the principal components of a first embodiment of the apparatus of the present invention.

In order better to understand the fastening of the assembly formed by the underwater flexible riser 14, with terminal connection 15 and traction head 16 to the coupling device 8, FIG. 2 should be seen in conjunction with FIG. 8, which shows a detail of the region where fastening takes place. The terminal connection 15 has a fastening tube 25 housed inside the coupling device 8 and enclosing the underwater flexible riser 14. Shearing pins 12 guarantee fastening of the assembly formed by the underwater flexible riser 14, terminal connection 15 and traction head 16 to the collar 26 of the coupling device 8.

In the present embodiment, it was chosen to fasten the shearing pins 12 to the fastening tube 25 by an interference fit, i.e. with their contact ends defining a circle whose diameter is smaller than the external diameter of the fastening tube 25. However, other means of fastening, such as glueing and threading, may be used, and the means of fastening used in the embodiment now described is not to be in any way regarded as limiting the present invention.

Again referring to FIG. 2, this shows that the traction head 16 is attached to a cable 19 which passes through the inside of the sleeve tube 13 and is connected to some means of traction, located on the structure which is not shown in FIG. 2. The cable 19 is the one responsible for the operation of raising the flexible pipe as far as its point of connection on the structure, an operation known by specialists as "pull-in". It should be noted that, as a precautionary measure, use may be made of more than one cable 19 to raise the assembly, as this provides a way in which to prevent possible breakages.

The apparatus of the present embodiment of the invention is shown in FIG. 2 in a position immediately prior to the coupling of its principal components. From this point onwards, there follows description of the method of the present embodiment of the invention, for use of the apparatus.

It should be noted that the projections 23 of the locking ring 5 do not appear in FIG. 2. This is because the locking ring 5 has previously been turned through a small angle so that its projections 23 no longer impede the pivoting movement of the locking pawls 3 about the axis of spindles 18. The locking ring 5 may be turned by a diver or, alternatively, by any equipment such as a remotely operated vehicle (ROV) which is able to carry out this function.

Figure 3:
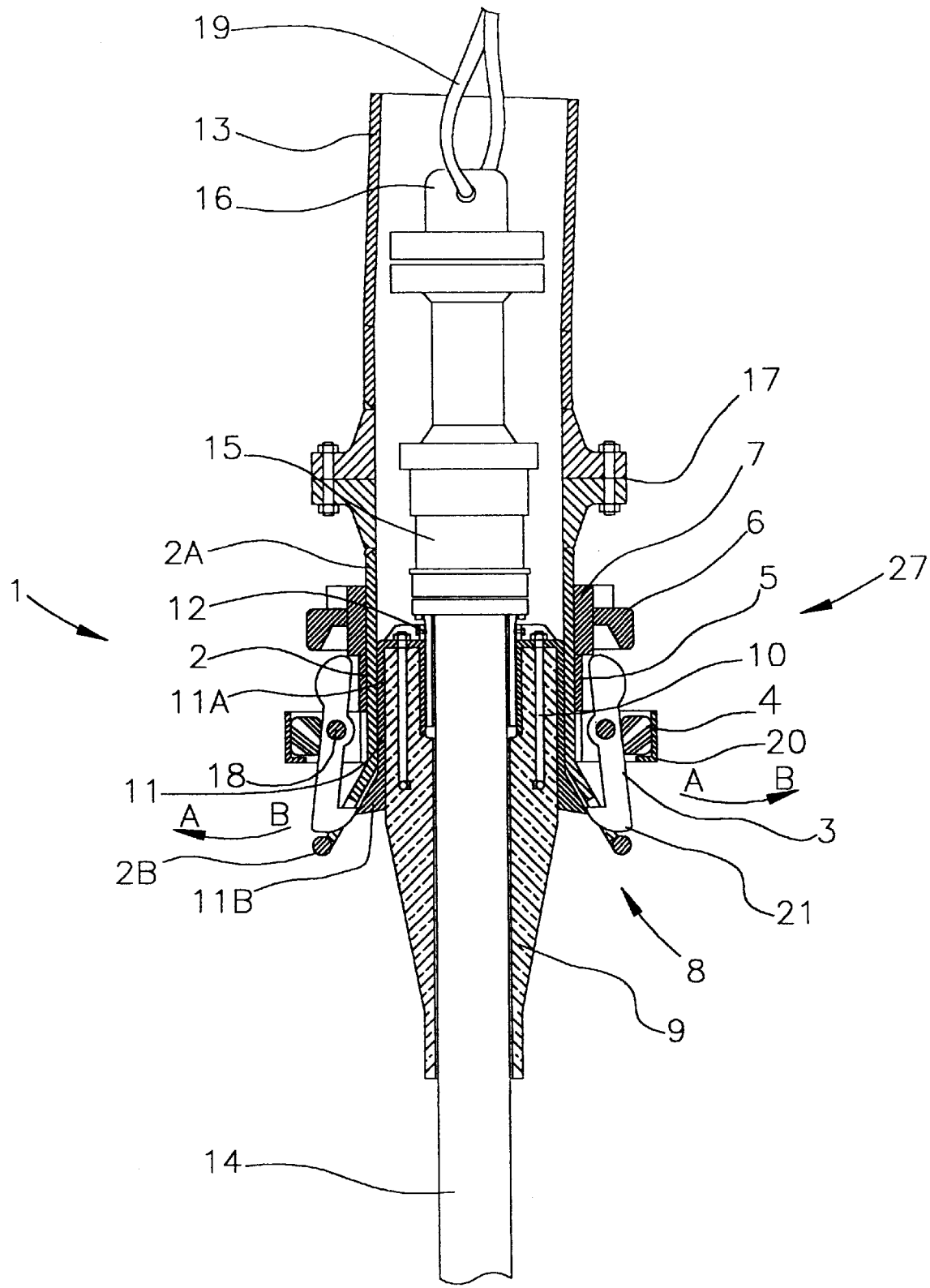
FIG. 3 shows a flexible pipe connected to the first embodiment of the apparatus, in a position immediately prior to engagement of its principal components.

With the raising operation continuing, the lower part 2B of the body acts as a guide to cause perfect coupling of the guide 11 of the coupling device 8 with the body 2 of the guide device 1, as shown in FIG. 3. The upper part 11A of the guide penetrates inside the upper part 2A of the body until the lower part 11B of the guide 11, which has the shape of a frustum of a cone, touches the claws 21 of the locking pawls 3.

From this moment, the claws 21 are first pushed outwards, in the direction of the arrows AB shown in FIG. 3, which causes the locking pawls 3 to pivot about the spindles 18 since the projections 23 of the locking ring 5 no longer impede this pivoting movement.

Figure 4:
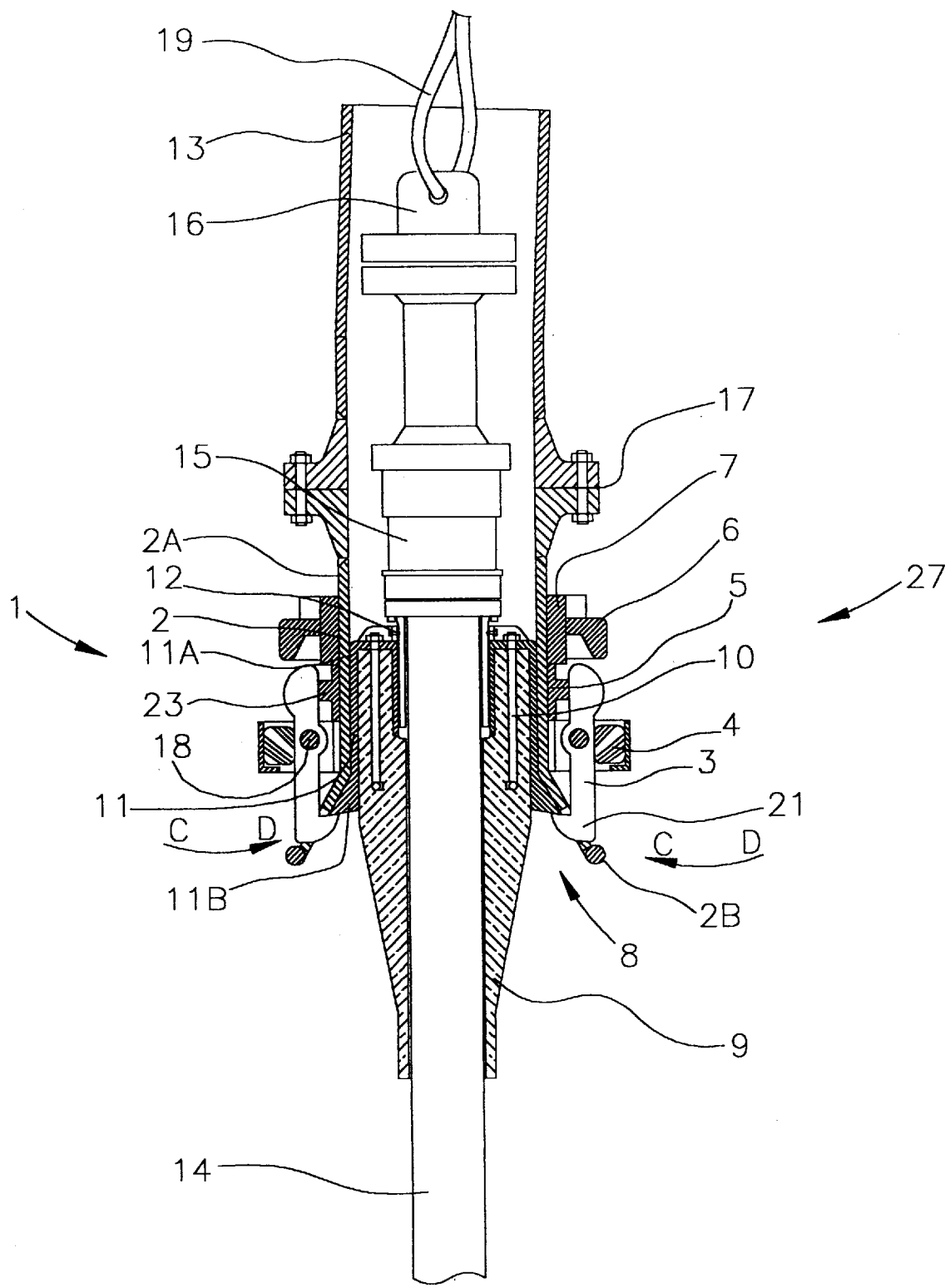
FIG. 4 shows a flexible pipe connected to the first embodiment of the apparatus, already in the raising phase, in a position immediately after engagement of its principal components.

As soon as the lower part 11B of the guide 11 projects beyond the claws 21, the claws are forced by the elastic elements 4 in the direction of the body 2, as suggested by the arrows CD shown in FIG. 4. When this movement has been completed, the coupling device 8 is locked since the lower part 11B of the guide of the coupling device 8 prevents the assembly from rising and, moreover, the claws 21 of the locking pawls 3 prevent the assembly descending. Next, the locking ring 5 is rotated so that its various projections 23 again prevent the respective locking pawls 3 from being able to turn about the axis of spindles 18.

Figure 5:
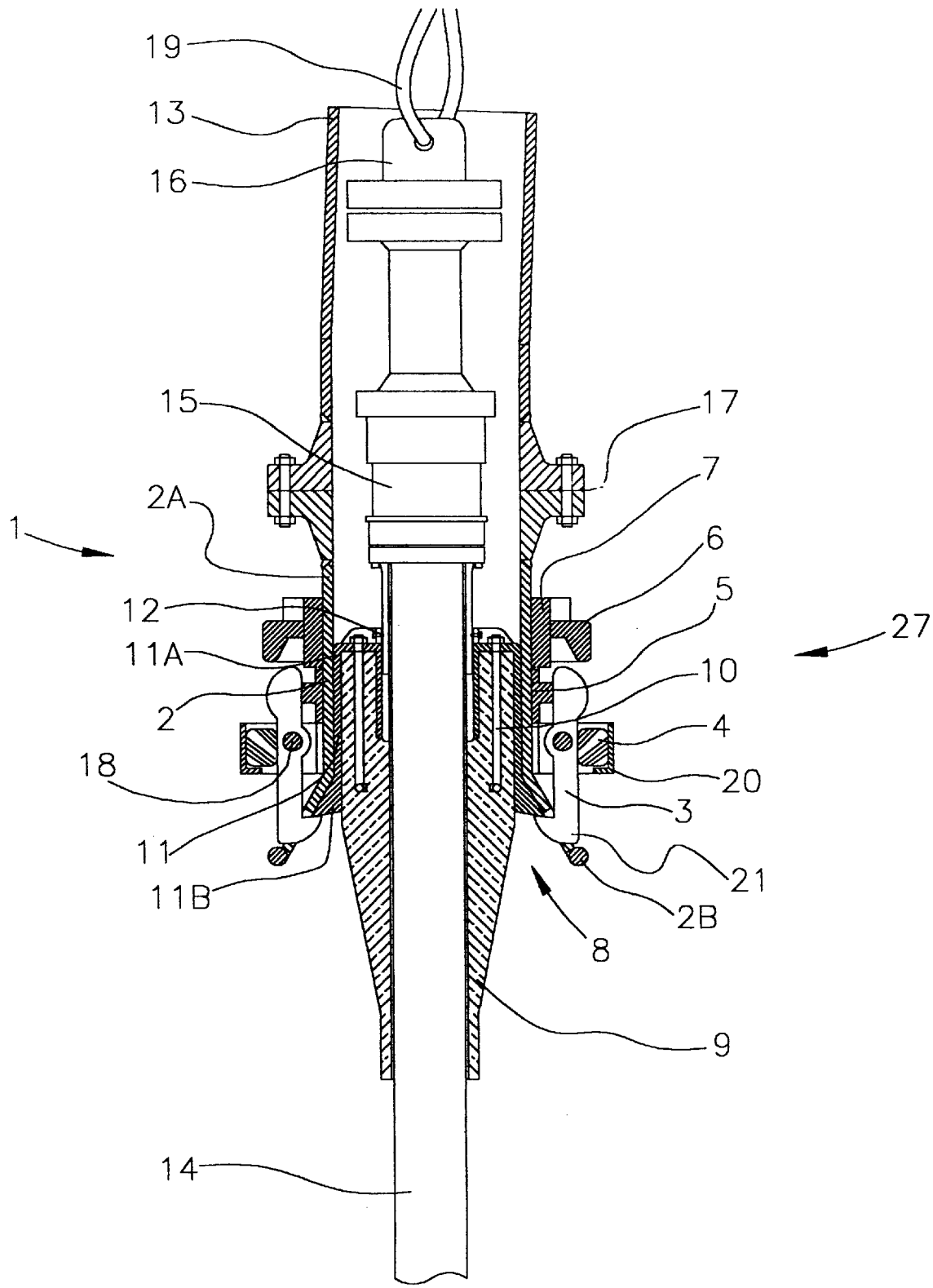
FIG. 5 shows the first embodiment of the apparatus with its principal components already engaged and with a flexible pipe in the raising phase.

The cable 19 continues to be pulled and, at a given moment, the shearing pins 12 break to cause the assembly formed by the traction head 16, the terminal connection 15 and the underwater flexible riser 14 to separate from the coupling device 8, as shown in FIG. 5. With the raising operation continuing by means of the traction of the cable 19, the assembly (referred to above) pulled by it is conveyed as far as the point not shown in FIG. 5 on the structure where the underwater flexible riser 14 will be connected, thereby completing the connection operation.

Figure 6:
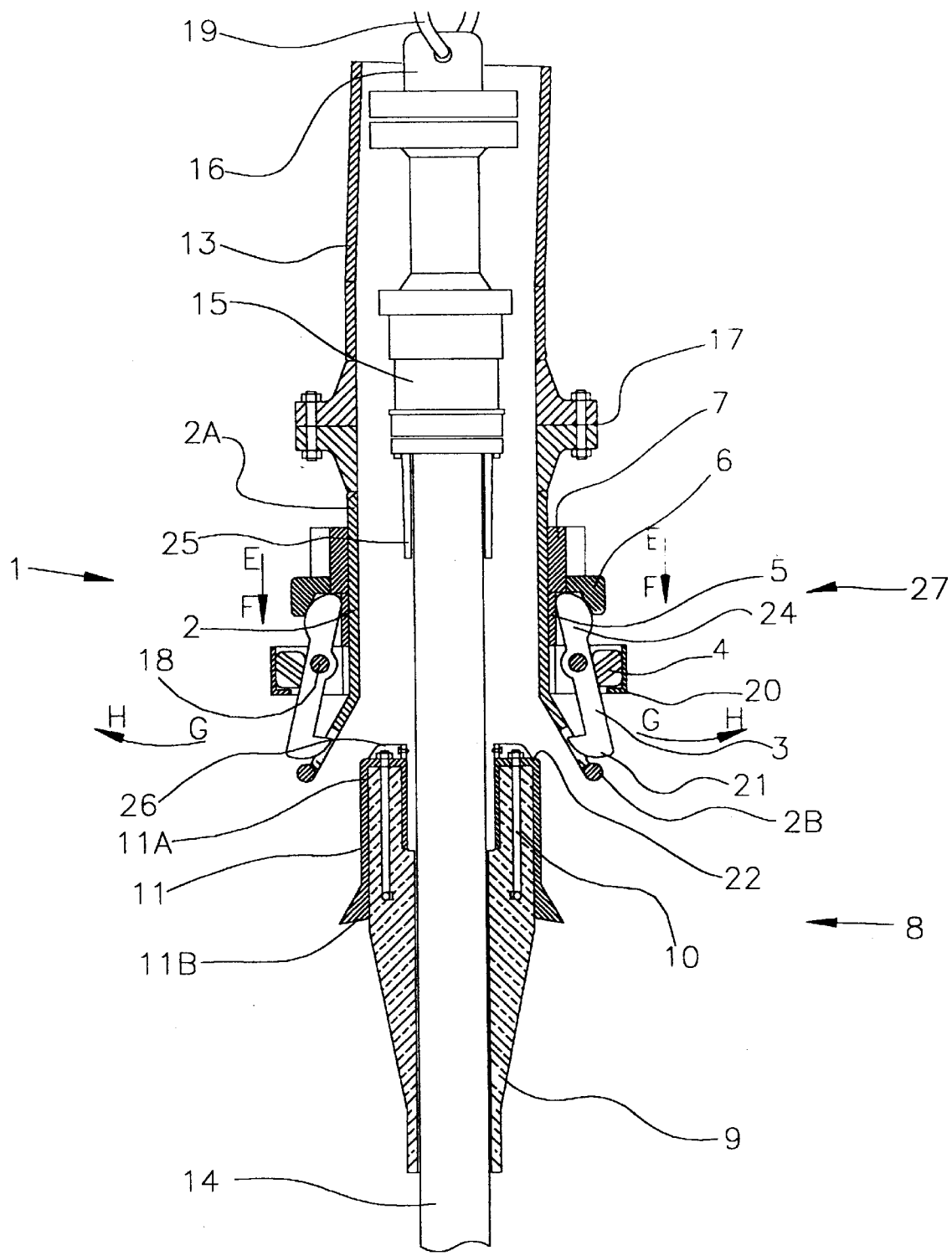
FIG. 6 shows the first embodiment of the apparatus with its principal components in the uncoupling phase.

When it is necessary to disconnect the coupling device 8 for withdrawal of the underwater flexible riser 14, the locking ring 5 has initially to be turned so that its projections 23 no longer prevent the respective locking pawls 3 from pivoting about the spindles 18. Then the unlocking collar 6 moves axially in the direction of the arrows EF shown in FIG. 6.

The axial movement of the unlocking collar 6 is provided by the guide element 7 which, in the present embodiment, has a helical slot which the unlocking collar 6 engages, so that the rotation of this collar 6, carried out by a diver or any equipment such as an ROV which can carry out the function, gives rise to its movement in the direction of the arrows EF. However, other means which permit the axial movement of the unlocking collar 6 may be used, and the description given above to demonstrate how the guide element 7 guides the unlocking collar 6 may not be regarded as limiting the present invention.

On entering into contact with the heads 24 of the locking pawls 3, the unlocking collar 6 forces these to pivot about the axes of spindles 18, in the direction of the arrows GH, which means that the claws 21 no longer retain the coupling device 8 inside the guide device, facilitating the release of the underwater flexible riser 14.

Figure 9:
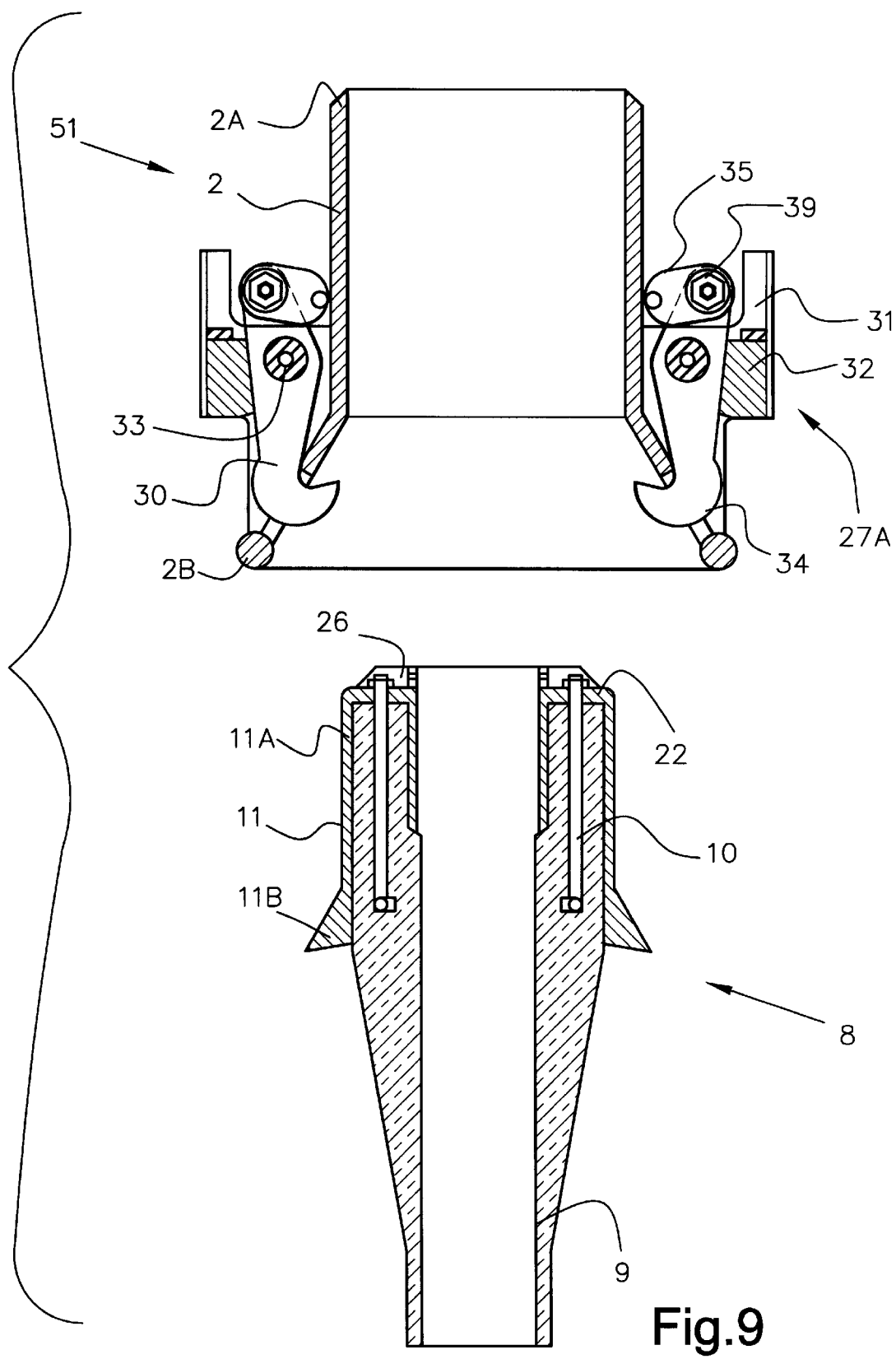
FIG. 9 shows the components of a second embodiment of the apparatus of the present invention, for connecting a flexible pipe.

FIG. 9 shows an alternative embodiment of a locking mechanism 27A of a guide device 51 for the apparatus for connecting a underwater flexible riser to a structure on the surface. It shows the components of the locking mechanism 27A fastened to the body 2, these being supports 31, locking pawls 30, elastic elements 32, spindles 33 and movement-limiting means 35.

The supports 31 are securely fastened to the body 2 and the locking pawls 30 and the elastic elements 32 are fastened on these supports.

The locking pawls 30 are fastened to the supports 31 by means of the spindles 33. The lower part of each locking pawl 30, which has the shape of a claw 34, is able to pass inside a slot in the lower part 2B of the body 2. On the upper part of each locking pawl 30 there is a movement-limiting means 35.

Figure 10B:
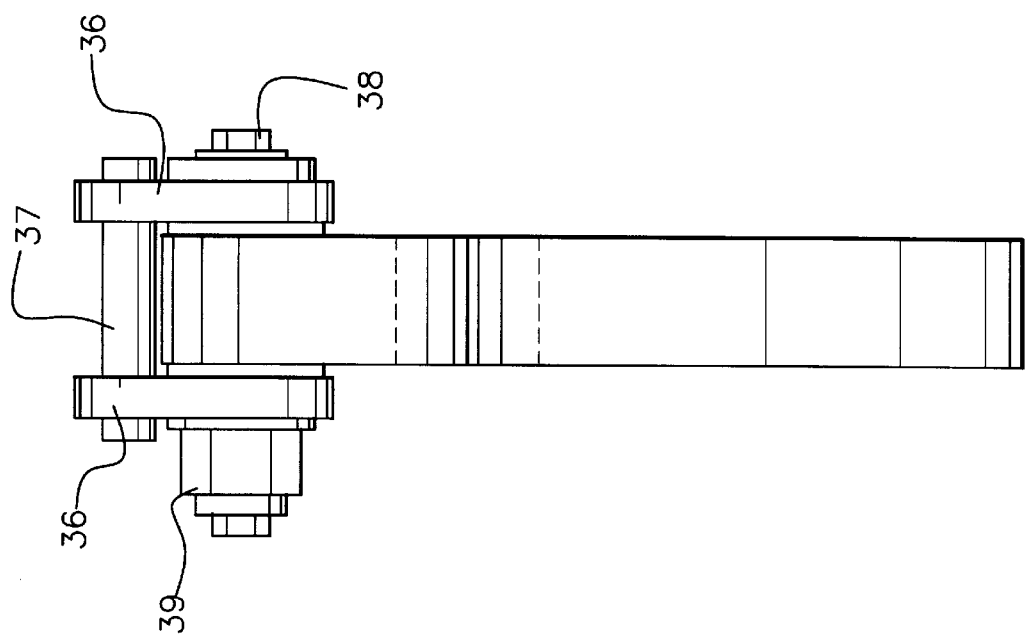
FIGS. 10A and 10B show, in detail, the locking device of the second embodiment of the apparatus of the present invention.
Figure 10A:
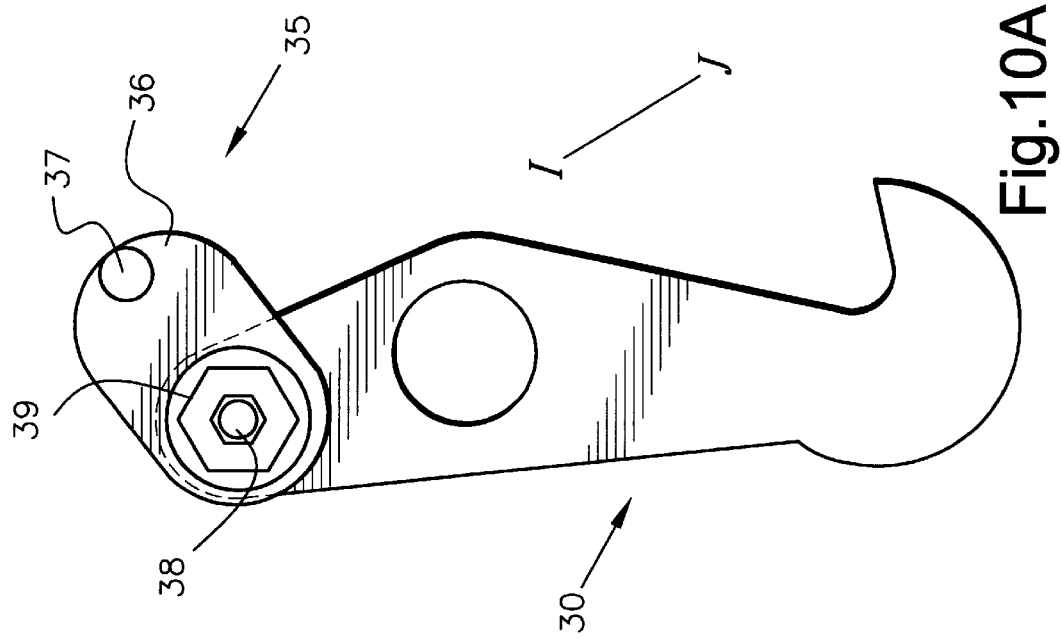
Figure 11B:
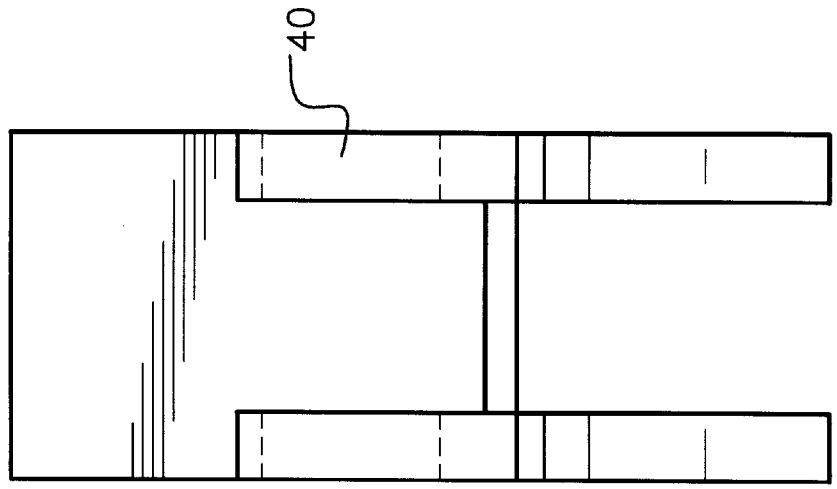
FIG. 11 shows, in detail, the support of the locking device of the second embodiment of the apparatus of the present invention.

FIGS. 10A and 11B show, in greater detail one of the locking pawls 30 and the support 31, respectively. As may be seen in FIGS. 10A and 11B, the movement-limiting means 35 comprises two plates 36 which are fastened together by a joining element 37. The movement-limiting means 35 is fastened to the locking pawl 30 by a pin 38 which has an actuating element 39 at one of its ends. The components of the assembly formed by the movement-limiting means 35, by the actuating element 39 and by the pin 38 are fitted together securely so that a rotation of the actuating element 39 about the pin 38 causes the rotation of the entire assembly.

As may be seen in FIGS. 10A and 11B, the locking pawls 30 are mounted on the supports 31 in such a manner that, in addition to undergoing rotational movements about the axes of the spindles 33, they are able to move rectilinearly in the direction IJ shown in the Figures, as will be seen better below. This rectilinear movement is possible by virtue of the oblong shape of a slot 40 in the lateral part of the support 31. As may be seen below, the rotational and linear-movement path of the locking pawls 30 is limited and is sufficient only to fulfil the function for which they are intended, which will become more clearly apparent later in the description.

As shown in FIG. 9, inside the supports 31 are elastic elements 32 whose function is to hold the locking pawl 30 in the locking position, which will also be better understood from the description given below.

The steps in the method for using the apparatus of the present embodiment are similar to those described for the preceding embodiment. A description will therefore be given only of those steps which differ from the method described previously.

Figure 12:
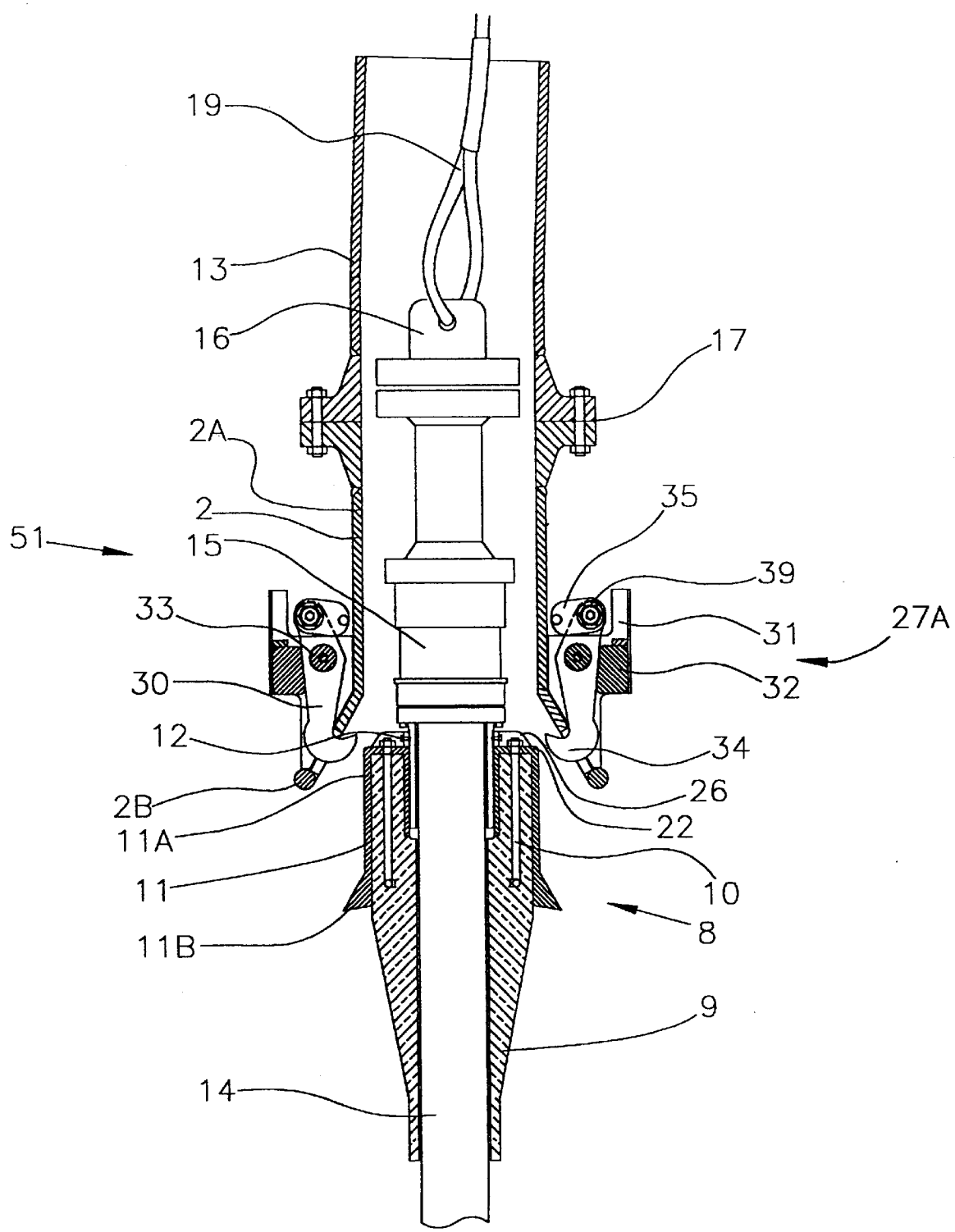
FIG. 12 shows a flexible pipe connected to the second embodiment of the apparatus, in a position close to the start of the operation of engaging its principal components.

The apparatus of the present embodiment is shown in FIG. 12 in a position immediately prior to the coupling of its principal components.

Figure 13:
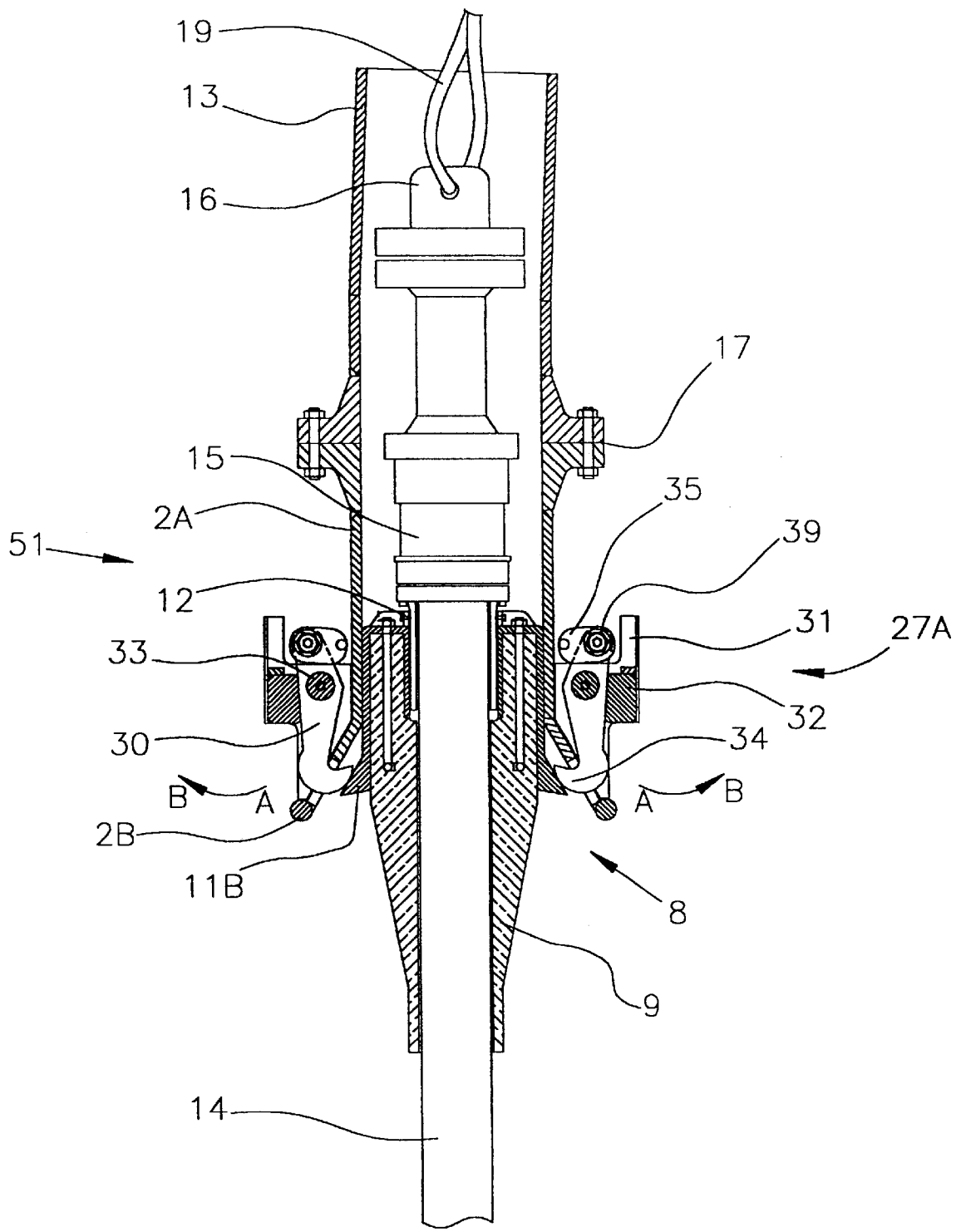
FIG. 13 shows a flexible pipe connected to the second embodiment of the apparatus, in a position at the start of the operation of engaging its principal components.

With the raising operation continuing, the lower part 2B of the body acts as a guide for perfect coupling of the coupling device 8 to the guide device 51, as shown in FIG. 13. The upper part 11A of the guide penetrates inside the upper part 2A of the body until the lower part 11B of the guide 11, which has the shape of a frustum of a cone, touches the claws 34 of the locking pawls 30.

Figure 11A:
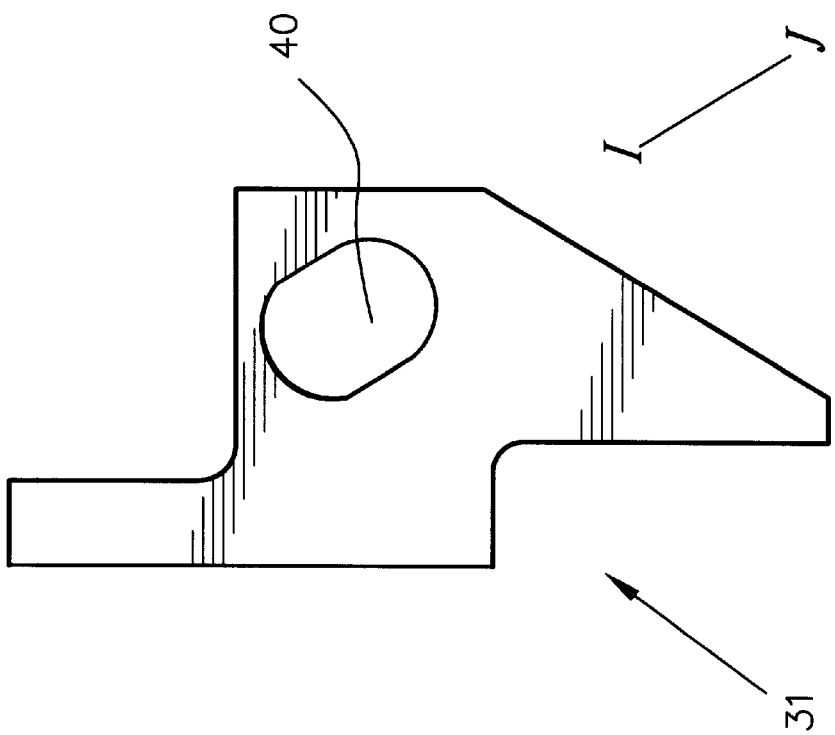
Figure 14:
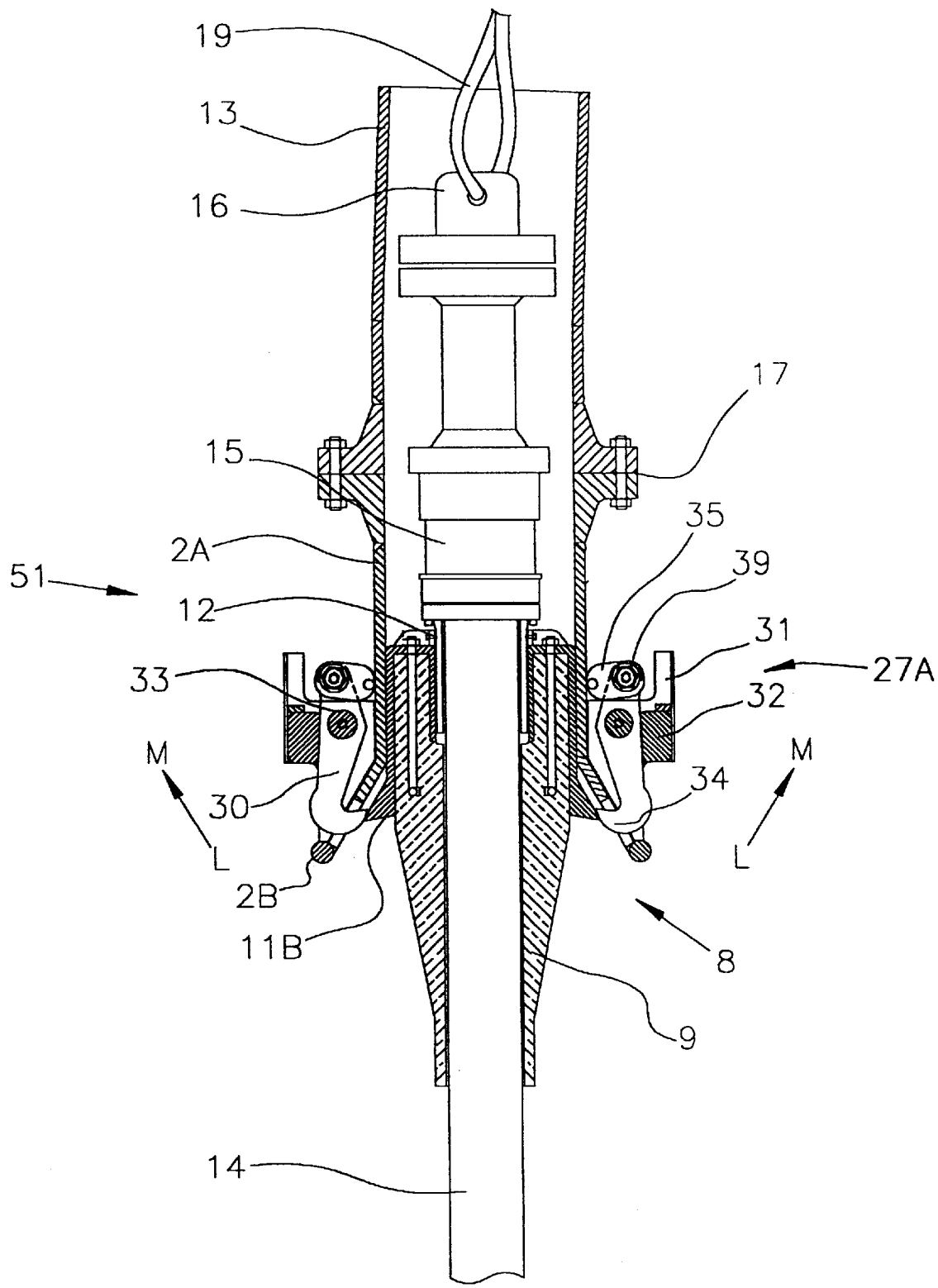
FIG. 14 shows a flexible pipe connected to the second embodiment of the apparatus, in a position immediately prior to engagement of its principal components.

From this moment, the claws 34 are pushed outwards, in the direction of the arrows AB shown in FIG. 13, which causes the locking pawls 30 to pivot about the axes of the spindles 33 until the movement-limiting means 35 prevents turning of the locking pawl 30, as shown in FIG. 14. From this moment, the contact-force component between the lower part 11B of the guide 11 and the claw 34 of the locking pawl 30 causes the pawl to move in the direction of the arrows LM, as a consequence of the oblong shape of the slot 40 in the support 31, shown in FIG. 11; this allows complete passage of the guide 11 and consequently of the guide device 51 position shown in FIG. 15.

Figure 15:
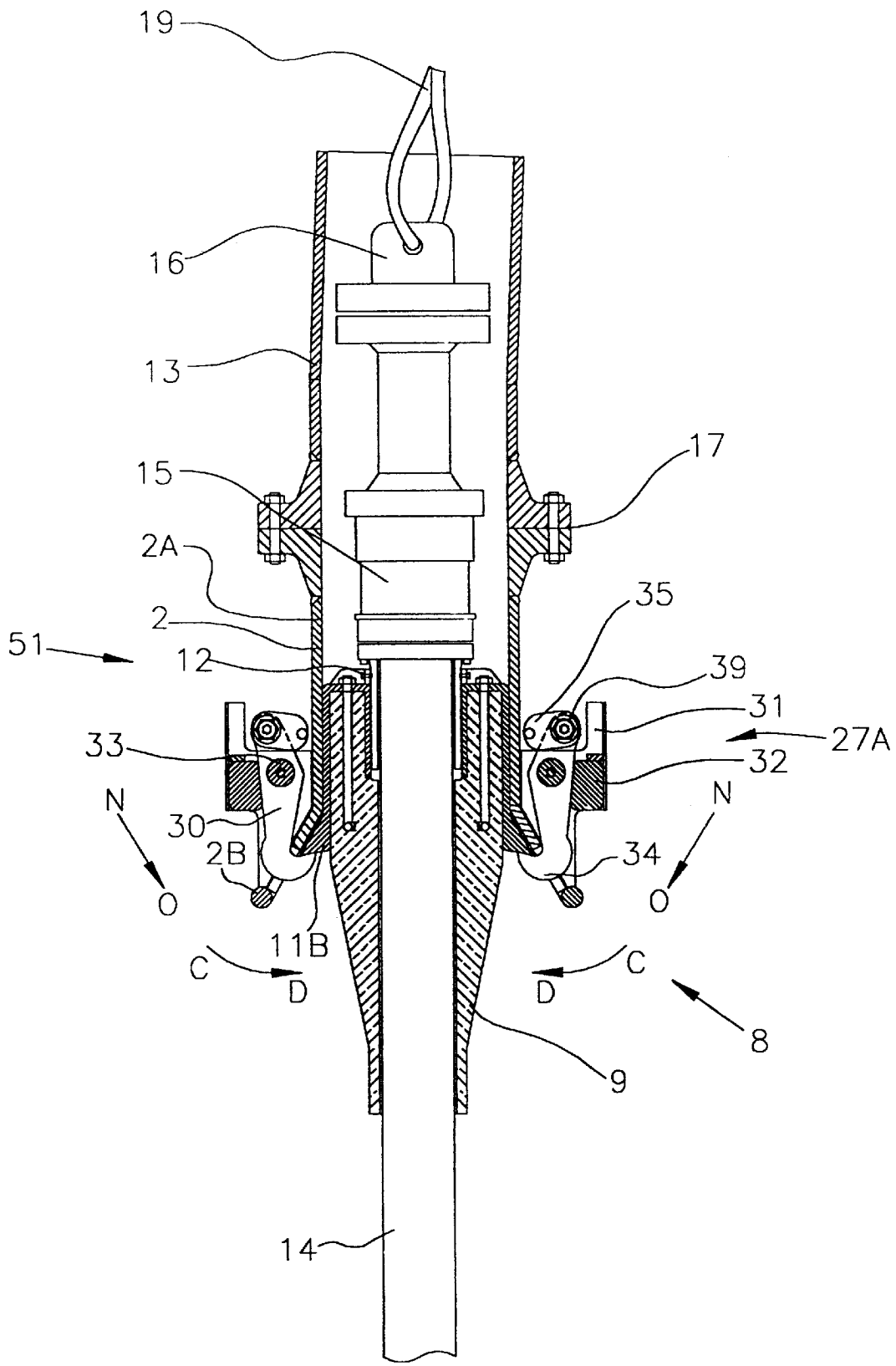
FIG. 15 shows a flexible pipe connected to the second embodiment of the apparatus, already in the raising phase, in a position immediately after engagement of its principal components.

As soon as the lower part 11B of the guide 11 projects beyond the claws 34, these are forced by the elastic elements 32 in the direction of the body 2, as suggested by the arrows CD shown in FIG. 15. In addition to this movement, the locking pawls 30 are drawn in the direction of the arrows NO by the weight of the coupling device 8. When the movement has been completed the coupling device 8 is locked, since the lower part 11B of the guide 11 of the coupling device 8 prevents the assembly from rising, and moreover the claws 34 of the locking pawls 30 prevent the assembly from descending. The geometry of the movement-limiting means 35 prevents the locking pawls 30 from pivoting sufficiently about the axes of the spindles 33 to release the coupling device 8.

From this point, the stages of the method described for the previous embodiment are repeated until due connection of the underwater flexible riser 14 occurs at the location on the structure intended for it, thereby completing the connection operation.

Figure 16:
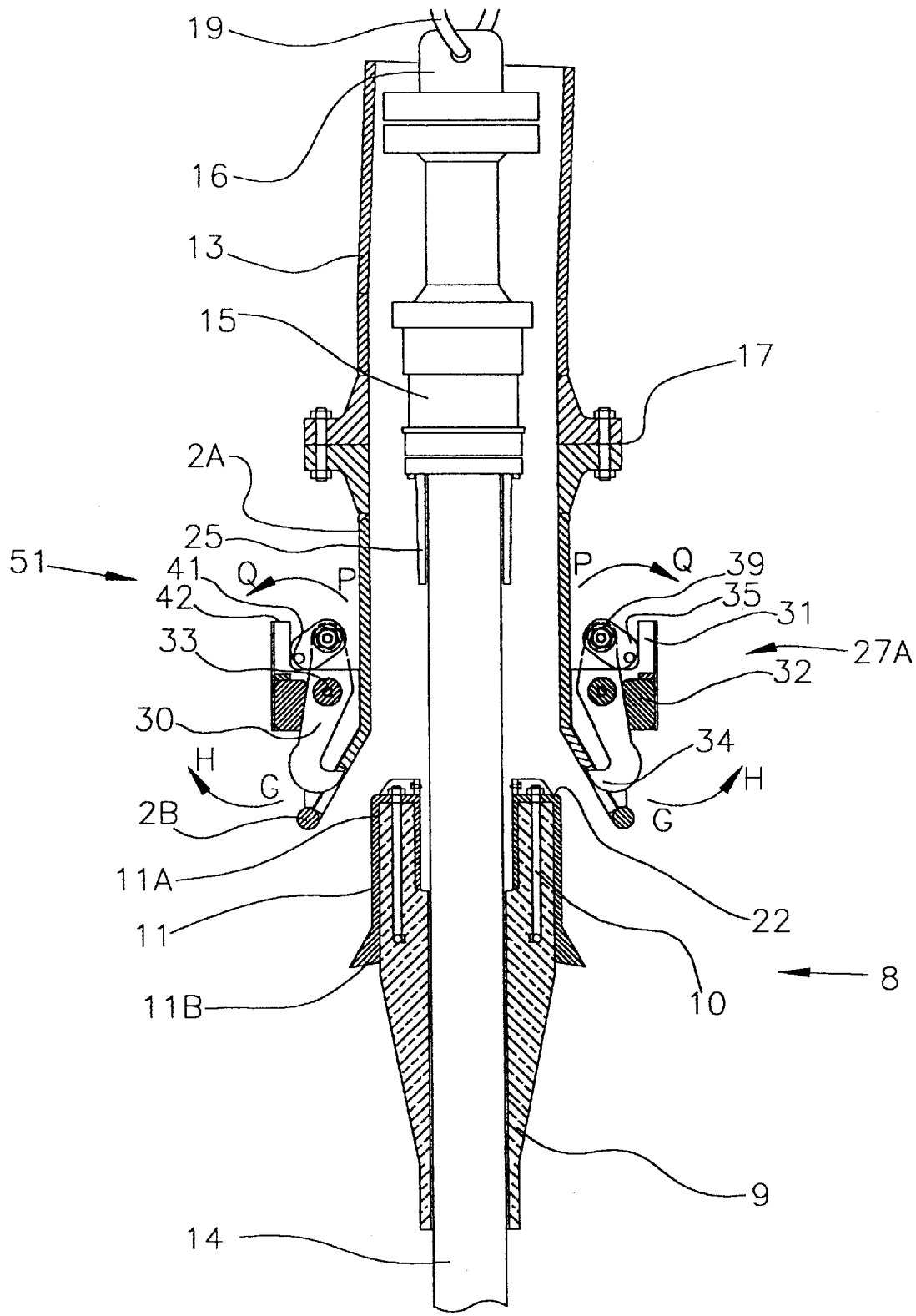
FIG. 16 shows the second embodiment of the apparatus with its principal components in the uncoupling phase.

As shown in FIG. 16, when it is necessary to disconnect the coupling device 8 for withdrawal of the underwater flexible riser 14, a tool initially has to be coupled in the actuating element 39 and a torque has to be applied to it, which promotes the rotation of the movement-limiting means 35 in the direction of the arrows PQ. The movement-limiting means 35 then turns until its end 41 touches the tab 42 of the support 31. Continued application of the torque to the actuating element 39 will cause the locking pawl 30 to turn about the axis of its spindle 33, in the direction of the arrows GH, which means that the claws 34 no longer retain the coupling device 8 inside the guide device, facilitating the release of the underwater flexible riser 14.

The embodiments presented here are only some of the possibilities of use of the basic concepts of the invention, facilitating connection of an underwater flexible riser to any point located above the sea surface on a surface structure with the aid of only a guide cable. These embodiments, however, may not in any way be regarded as limiting the invention as defined by the scope of the following claims.

What is claimed is:

1. Apparatus for connecting an underwater flexible riser to a surface structure disposed at a water surface, comprising:

a terminal connector fastened to an upper end of the underwater flexible riser, said upper end being a connection end of said underwater flexible riser;

a traction head connected to an upper portion of said terminal connector;

a coupling device encircling and detachably fastened to said connection end, said coupling device being provided with fastening means for fastening to said connection end, said coupling device having a cylindrically shaped upper portion and a lower portion shaped as a frustum of a cone;

at least one pulling cable extending from a pulling assembly disposed in the surface structure and having a lower end secured to said traction head, said at least one pulling cable being adapted to raise an assembly formed by said traction head, said terminal connector, said coupling device and said connecting end of said underwater flexible riser from a sea bed towards a final destination located on the surface structure;

a guide device for guiding and engaging said coupling device when the coupling device is raised from the sea bed by said at least one pulling cable, said guide device being securely connected to a lower end of a hollow rigid member extending downwardly from the surface structure, said at least one pulling cable extending from the surface structure through the hollow rigid member and said guide device, said guide device having a cylindrically shaped upper portion and a flared lower portion shaped as a frustum of a cone, so that, when said coupling device engages said guide device, said frustoconical lower portion of said guide device receives and engages said frustoconical lower portion of said coupling device; and locking structure fastened to said guide device for locking said guide device to said coupling device when said guide device receives and engages said coupling device therewithin; wherein said locking structure comprises a plurality of locking pawls pivotally mounted to said guide device, a lower end of each locking pawl being shaped to engage and be locked to said frustoconical lower portion of said coupling device when and as soon as a lowest portion of said frustoconical lower portion of said coupling device is received in said guide device so as to be disposed above said lower end of each locking pawl.

2. The apparatus of claim 1, wherein said lower end of each said locking pawl which engages said lowest portion of said frustoconical lower portion of said coupling device is shaped as a claw, each claw being constructed and arranged to pass through a respective slot of a plurality of slots defined in said lower frustoconical portion of said guide device.

3. The apparatus of claim 2, wherein said locking structure further comprises a locking mechanism comprising:

a locking ring encircling said guide device, said locking ring having a plurality of projections, each of said projections being radially aligned with a respective locking pawl, each said projection being adapted to hold an upper portion of a respective locking pawl in a locking position after said coupling device has been coupled to said guide device thereby preventing unintentional unlocking thereof by movement or vibration;

a plurality of supports securely fastened to said guide device, each of said supports being pivotally connected to a respective locking pawl of said plurality of locking pawls by means of a spindle securely fastened to said support; and a plurality of elastic elements, each elastic element of said plurality of elastic elements being located inside a respective support for inwardly biasing a respective locking pawl of said plurality of locking pawls so as to hold said respective locking pawl in a locking position.

4. The apparatus of claim 3, wherein each locking pawl of said plurality of locking pawls is provided with an upper end forming a head, each said head being adapted to be inwardly actuated by an unlocking means so as to provoke an outward movement of respective claw, thereby releasing said coupling device.

5. The apparatus of claim 4, wherein said unlocking means comprises:

a guide element securely fastened to said guide device; and an unlocking collar securely interconnected to said guide element for unlocking each locking pawl of said plurality of locking pawls when said unlocking collar is downwardly displaced, thereby to unlock and to release said coupling device.

6. The apparatus of claim 3, wherein said fastening means for fastening said coupling device to said connection end of said underwater flexible riser comprises a plurality of shearing pins.

7. The apparatus of claim 6, wherein said connection end is enclosed in a bending stiffener.

8. The apparatus of claim 2, wherein said locking structure further comprises a locking mechanism comprising:

a plurality of supports securely fastened to said guide device, each support pivotally connecting a respective locking pawl by means of a spindle securely fastened to said support, said spindle passing through an oblong slot defined in said support;

a plurality of elastic elements, each elastic element being located inside a respective support for inwardly biasing a respective locking pawl so as to hold said respective locking pawl in a locking position thereby preventing unintentional unlocking thereof by movement or vibration; and a plurality of movement-limiting assemblies, each movement-limiting assembly comprising two plates fastened together at a first end by a joint element and at a second end to an upper end of a respective locking pawl by a pin.

9. The apparatus of claim 8, wherein said fastening means for fastening said coupling device to said connection end of said underwater flexible riser comprises a plurality of shearing pins.

10. The apparatus of claim 9, wherein said connection end is enclosed in a bending stiffener.

11. The apparatus of claim 8, wherein said pin which connects said each locking pawl to each said movement-limiting assembly is provided with an actuating means, wherein a rotation of said actuation means about said pin causes a rotation of the entire movement-limiting assembly, thereby unlocking and disconnecting said coupling device from said guide device.

12. The apparatus of claim 5, wherein said fastening means for fastening said coupling device to said connection end of said underwater flexible riser comprises a plurality of shearing pins.

13. The apparatus of claim 12, wherein said connection end is enclosed in a bending stiffener.

14. A method for connecting an underwater flexible riser to a surface structure disposed at a water surface, using an apparatus comprising a guide device connected to a lower end of a hollow rigid member extending downwardly from the surface structure, said guide device having a cylindrical upper portion and a flared lower portion shaped as a frustum of a cone; a coupling device encircling and detachably fastened with shearing pins to a connection end of said underwater flexible riser, said coupling device having a cylindrical upper portion and a lower portion shaped as a frustum of a cone; a locking structure comprising a plurality of locking pawls for locking said guide device to said coupling device, said locking pawls being pivotable with respect to said guide device and each having a claw at a lower end thereof; a terminal connector fastened to the connection end of said underwater flexible riser; a traction head connected to an upper portion of said terminal connector; and at least one pulling cable extending from in the surface structure and having a lower end secured to said traction head, said at least one pulling cable passing through said hollow rigid member and said guide device and being adapted to raise said underwater flexible riser from a sea bed to a final destination located on the surface structure, wherein the method comprises the following steps:

applying traction to said at least one pulling cable so as to raise an assembly formed by said traction head, said terminal connector, said coupling device and said connection end of said underwater flexible riser towards the surface structure; and continuing said raising movement so that the flared lower portion of said guide device acts as a guide for entry of said cylindrical upper portion of said coupling device into said guide device; and wherein said frustoconical lower portion of said coupling device touches each claw of said plurality of locking pawls thereby to push said claw outwardly causing a pivotal movement in a first direction of a respective locking pawl of said plurality of locking pawls, thereby enabling said frustoconical lower portion of said coupling device to continue its raising movement;

wherein as soon as a lowest portion of said frustoconical lower portion of said coupling device is raised beyond each said claw, said respective locking pawl pivots in a second direction opposite to said first direction, causing each claw to move inwardly and thereby engage said lowest portion of said frustoconical lower portion of said coupling device, whereby said flared lower portion of said guide device acts as a bumper to said frustoconical lower portion of said coupling device and said coupling device becomes securely engaged and locked into said guide device; and wherein as said traction continues to be applied to said at least one pulling cable, each of said shearing pins is sheared, thereby enabling said assembly to continue its raising movement towards the surface structure.

15. The method of claim 14, wherein the locking structure further comprises a locking mechanism including a locking ring encircling said guide device, said locking ring having a plurality of projections, each of said projections being radially aligned with a respective locking pawl, each said projection being adapted to hold an upper portion of a respective locking pawl in a locking position after said coupling device has been coupled to said guide device thereby preventing unintentional unlocking thereof by movement or vibration; a plurality of supports securely fastened to said guide device, each of said supports being pivotally connected to a respective locking pawl of said plurality of locking pawls by means of a spindle securely fastened to said support; and a plurality of elastic elements, each elastic element of said plurality of elastic elements being located inside a respective support for inwardly biasing a respective locking pawl of said plurality of locking pawls so as to hold said respective locking pawl in a locking position; and further comprising the following steps to unlock said coupling device from said guide device for withdrawal of said underwater flexible riser:

initially turning said locking ring until each projection of said plurality of projections no longer impedes a respective locking pawl of said plurality of locking pawls from pivoting about a respective spindle;

next, mounting an unlocking collar which slides along a guide element connected to said cylindrical upper portion of said guide device axially downwardly; and as said unlocking collar contacts a head of each locking pawl, each said head being located in said upper portion of each locking pawl, and each locking pawl is forced to pivot again in said first direction causing each claw of each locking pawl to move outwardly so that said each claw no longer engages said lowest portion of said frustoconical lower portion of said coupling device thereby unlocking said coupling device from said guide device, which enables releasing of said underwater flexible riser.

16. A method for connecting an underwater flexible riser to a surface structure disposed at a water surface using an apparatus comprising a guide device connected to a lower end of a hollow rigid member extending downwardly from the surface structure, said guide device having a cylindrical upper portion and a flared lower portion shaped as a frustum of a cone; a coupling device encircling and being detachably fastened with shearing pins to a connection end of said underwater flexible riser, said coupling device having a cylindrical upper portion and a lower portion shaped as a frustum of a cone; a locking structure comprising a plurality of locking pawls for locking said guide device to said coupling device, said locking pawls being pivotable with resect to said guide device, and each having a claw at a lower end thereof; a plurality of movement-limiting assemblies, each linked to a respective locking pawl for limiting pivotable movement thereof; a terminal connector fastened to a connection end of said underwater flexible riser; a traction head connected to an upper portion of said terminal connector; and at least one pulling cable extending from the surface structure and having a lower end secured to said traction head, said at least one pulling cable passing through said guide device and being adapted to raise said underwater flexible riser from a sea bed to a final destination located on the surface structure, wherein the method comprises the following steps:

applying traction to said at least one pulling cable so as to raise an assembly formed by said traction head, said terminal connector, said coupling device and said connection end of said underwater flexible riser towards the surface structure;

continuing said raising movement so that the flared lower portion of said guide device initially acts as a guide for the entrance of the upper cylindrical portion of said coupling device into said guide device;

wherein during said raising movement said frustoconical lower portion of said coupling device touches each claw of said plurality of locking pawls, pushing each said claw outwardly causing a pivotal movement in a first direction of a respective locking pawl, thereby enabling said frustoconical lower portion of said coupling device to continue its raising movement;

wherein as said raising movement of said coupling device progresses, each said movement-limiting assembly impedes the continuation of said pivotal movement in said first direction, and thereafter a contact-force component between said lower portion of said coupling device and said each claw causes each locking pawl to move in an oblique direction with respect to an axis of symmetry of said guide device, thereby allowing said coupling device to continue its raising movement;

wherein as soon as a lowest portion of said frustoconical lower portion of said coupling device raises beyond each said claw, said locking pawls elastically pivot in a second direction opposite to said first direction, causing each claw to move inwardly, thereby engaging said lowest portion of said frustoconical lower portion of said coupling device, and wherein said flared lower portion of said guide device acts as a bumper to said frustoconical lower portion of said coupling device, whereby said coupling device becomes securely engaged and locked into said guide device; and as said traction continues to be applied to said at least one pulling cable, each shearing pin fastening said coupling device to said underwater flexible riser is sheared, thereby enabling said assembly to continue its raising movement towards the surface structure.

17. The method of claim 16, further comprising the following step to disconnect said coupling device for withdrawal of said underwater flexible riser:

initially applying torque to a plurality of actuating means each said actuating means being located in an upper portion of a respective locking pawl, so that each claw is pushed outwardly so that said claw no longer engages said lowest portion of said frustoconical lower portion of said coupling device, thereby unlocking said coupling device from said guide device, and thereby releasing said underwater flexible riser.

* * * * *